United States Patent [19]

Kogami et al.

[11] 4,236,220
[45] Nov. 25, 1980

[54] METHOD FOR CONTROLLING THE OPERATION OF NUCLEAR ELECTRIC GENERATING PLANT

[75] Inventors: Mineichi Kogami, Tokyo; Toshikatsu Neda, Tokorozawa, both of Japan

[73] Assignee: Tokyo Shibaura Denki Kabushiki Kaisha, Kanagawa, Japan

[21] Appl. No.: 644,813

[22] Filed: Dec. 29, 1975

[30] Foreign Application Priority Data

Dec. 25, 1974 [JP] Japan .................. 49-148184

[51] Int. Cl.² ............................................. G21D 3/08
[52] U.S. Cl. ....................................... 364/504; 60/39;
60/28 T; 176/20 R; 176/24; 364/106
[58] Field of Search ............ 235/151.1, 151.21, 150.1;
176/20 R, 33, 22, 23, 24; 60/39.28 T; 364/504,
105, 106, 493, 495

[56] References Cited

U.S. PATENT DOCUMENTS

| | | | |
|---|---|---|---|
| 2,931,761 | 4/1960 | Hurwitz | 235/151 |
| 3,033,774 | 5/1962 | Crever | 176/25 |
| 3,105,029 | 9/1963 | Kovanic et al. | 176/25 |
| 3,255,084 | 6/1966 | Doruszlai | 176/20 R |
| 3,296,083 | 1/1967 | Haake et al. | 176/20 R |
| 3,356,577 | 12/1967 | Fishman | 176/24 |
| 3,387,282 | 6/1968 | Jacques | 235/150.1 |
| 3,424,653 | 1/1969 | Cohn | 176/22 |
| 3,483,081 | 12/1969 | Sparks et al. | 235/151 |
| 3,728,526 | 4/1973 | Youngblood | 235/151.1 |
| 3,772,504 | 11/1973 | De Bray | 235/151.1 |
| 3,947,665 | 3/1976 | Hundley | 235/150.1 |
| 4,027,145 | 5/1977 | McDonald et al. | 364/495 |
| 4,080,251 | 3/1978 | Musick | 364/504 |

OTHER PUBLICATIONS

Lennox et al.; Thermal Power Control of the NRV Reactor; IRE Transactions on Nuclear Science; Aug. 1958; pp. 68-72.
Harrer; Controlling a Power-Producing Nuclear Reactor; Nucleonics; Mar. 1950; pp. 58-65.

*Primary Examiner*—Errol A. Krass
*Attorney, Agent, or Firm*—Stevens, Davis, Miller & Mosher

[57] ABSTRACT

An operation limit, a target value of the operation and an optimum rate of changing the operation state of a machine or apparatus of the plant are determined and stored in the memory device of an electronic computer. The computer processes the operation limit, the target value, the optimum rate of change, and the data regarding the present operation state of the machine such that the machine is controlled within the operation limit or an anticipation control of the machine is performed.

2 Claims, 9 Drawing Figures

METHOD FOR CONTROLLING THE OPERATION OF NUCLEAR ELECTRIC GENERATING PLANT

BACKGROUND OF THE INVENTION

This invention relates to a method and system for controlling the automatic operation of a nuclear electric power generating plant and more particularly to such method and system utilizing an electronic computer.

Most electric energy is now generated by steam electric power generating plants utilizing such fossil fuels as coal and petroleum but potential sources of such fossil fuels are limited. Furthermore, combustion of fossil fuels accompanies a problem of pollution of the atmosphere. Accordingly, nuclear energy will be used extensively in the future as a source of electric energy.

However, the operation and control of a nuclear electric power generating plant (for brevity, hereinafter abbreviated as nuclear plant) are extremely complicated and involve one thousand or more operating devices, instruments or the like which the operator of the plant should operate or supervise, and the operation of such operating devices are related to each other. For example, it is necessary to operate them according to a prescribed sequence.

Other factors that make difficult the operation and control of a nuclear plant involve due consideration of the characteristics of the nuclear reactor itself, the pressure of the reactor pressure vessel, and the thermal power or output of the fuel rods in the reactor core, which make more difficult the operation of the operator. Moreover, there are many instruments, recording meters, operating conditions of reactor elements, for example the output distribution and local peaking of the fuel rod (local peak of the output) and voluminous data obtained by computing various quantities of the machines and apparatus in the plant.

For this reason, the operator of the nuclear plant is required to operate the plant by carefully watching a plurality of instruments, recording meters and numerous data. However, as described above the number of such meters and data are numerous and related to each other in complicated fashions, and the operator is required to have a high degree of skill and experience for satisfactorily operating the plant.

In recent years, in view of the shortage of fossil fuels and the problem of pollution the number of nuclear plants is increasing gradually. However, it is difficult to secure excellent operators.

SUMMARY OF THE INVENTION

Accordingly it is an object of this invention to provide an improved method and system for controlling the automatic operation of a nuclear plant capable of operating the same safely, accurately and economically without the defects described above.

Another object of this invention is to provide a novel method and system for controlling the operation of a nuclear power plant capable of operating the machines and apparatus within predetermined operation limits.

Still another object of this invention is to provide a novel method and system for controlling the operation of a nuclear plant capable of performing anticipation control of the machines and apparatus of the plant.

According to one aspect of this invention there is provided a method of controlling the operation of a nuclear electric power generating plant including a plurality of machines comprising the steps of predetermining an operation target value of a machine of the plant, determining the difference between the target value and the present operation value of the machine, producing an operation quantity in response to the difference necessary to eliminate the same, determining an operation limit of the machine, processing the operation quantity in accordance with the operation limit for producing a control signal and controlling the machine in accordance with the control signal thereby operating the machine within the limit.

According to another aspect of this invention there is provided a method of controlling the operation of a nuclear electric power generating plant including a plurality of machines by means of an electronic computer, the method comprising the steps of predetermining an operation target value of a machine of the plant, determining the difference between the target value and the present operation value of the machine, processing the difference for producing an operation quantity, determining an anticipation model by anticipating the change in the operation state of the machine which would occur when the machine is controlled by the operation quantity, processing the operation quantity in accordance with the anticipation model for producing an anticipation value, predetermining an operation limit of the machine, comparing the anticipation value with the operation limit for producing a correction quantity, adding the operation quantity to the correction quantity for producing a control signal and performing an anticipation control of the machine in accordance with the control signal.

According to another aspect of this invention there is provided a system for controlling the operation of a nuclear electric power generating plant including a plurality of machines by means of an electronic computer, wherein the computer comprises means for predetermining an operation target value of a machine of the plant, means for producing the difference between the target value and the present operation value of the machine, means responsive to the difference for producing an operation quantity, means responsive to the difference for producing an operation quantity necessary to eliminate the difference, means for determining an operation limit of the machine, means for processing the operation quantity in accordance with the operation limit for producing a control signal, and means for controlling the machine in accordance with the control signal thereby operating the machine within the limit.

According to another aspect of this invention there is provided a system for controlling the operation of a nuclear power electric generating plant including a plurality of machines by means of an electronic computer, wherein the computer comprises means for predetermining an operation target value of a machine of the plant, means for producing the difference between the target value and the present operation value of the machine, means responsive to the difference for producing an operation quantity, means for processing the operation quantity in accordance with an anticipation model determined by anticipating the change in the operation state of the machine which would occur when the machine is controlled by the operation quantity, thereby producing an anticipation value, means for comparing the anticipation value with a predetermined operation limit of the machine for producing a correction quantity, and means for generating a control signal for the machine in accordance with the sum of the operation quantity and the correction quantity, and means for controlling the machine in accordance with the control signal thereby performing an anticipation control of the machine.

According to still another aspect of this invention there is provided a method and system wherein an optimum rate of change of the operation state of a machine (or apparatus) of the nuclear plant is predetermined, the difference between the optimum rate of change and the present rate of change of the operation state of the machine is determined, an operation quantity necessary to eliminate the aforementioned difference is produced in response thereto, a predetermined limit of the operation state of the machine is determined, the operation quantity is processed in accordance with the operation state limit for producing a control signal, and the machine is controlled in accordance with the control signal so as to operate the machine with the optimum rate of change until the predetermined operation state limit is reached.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
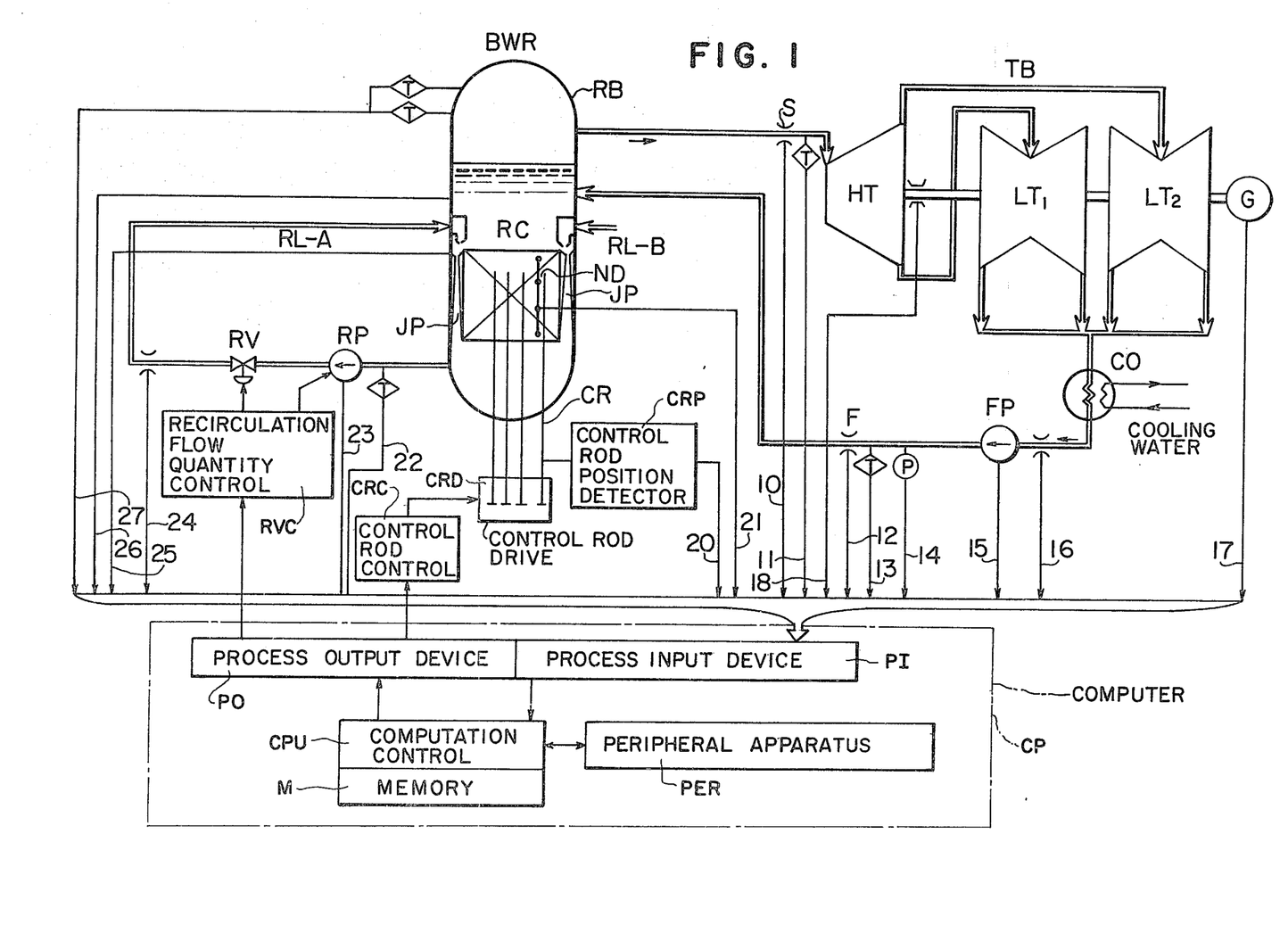
FIG. 1 is a diagram, partly in block form, showing the arrangement and connections of various machines and apparatus of a nuclear plant to which the method and system of this invention are applicable.

The nuclear plant illustrated in FIG. 1 comprises a boiling water type nuclear reactor BWR, a steam turbine set TB, an electric generator G driven thereby and an electronic computor CP for controlling the operation of the plant. The nuclear reactor BWR comprises a pressure vessel RB and a reactor core RC contained in the lower portion of the pressure vessel RB. Although not shown in FIG. 1 the core RC is provided with fuel rods, control rods CR for controlling the thermal output of the reactor and neutron flux detectors ND for detecting the neutron flux in the core as will be described later in more detail. The reactor BWR is equipped with recirculation loops RL-A and RL-B (having the same construction) for controlling the steam output of the reactor, a recirculation pump RP and a recirculation flow control valve RV included in each recirculation loop, control devices RVC for controlling the recirculation flow quantity, jet pumps JP for enhancing the circulation of water in the reactor, a control rod drive means CRD, and a control rod position detector CRP. Although in the drawing the detector is shown diagrammatically, in an actual reactor a plurality of reed switches are provided for each control rod and the detector comprises means for accurately determining the position of each control rod.

Turning now to the steam system, steam from the reactor vessel RB is admitted into the high pressure turbine HT, and then into two low pressure turbines $LT_1$ and $LT_2$ in parallel for driving the generator G. The exhaust from the low pressure turbines is condensed in a condenser CO cooled by cooling water and the condensate is returned to the reactor vessel by a feed pump FP.

The electronic computer CP enclosed in dot and dash lines comprises a process input device PI, a process output device PO, a computation control device CPU, a memory device M, peripheral apparatus PER such as a typewriter, an operators console and other control devices. Various data from the machines and apparatus of the plant are applied to the computation control device CPU. The data computed and processed thereby are stored in the memory device M or, if desired, used to apply message outputs to the peripheral apparatus PER such as a cathode ray tube and a typewriter or send control signals to the machines and apparatus of the plant via the process output device PO.

Various data written in the computor CP via the process input device PI are detected by various detectors provided at various portions of the plant, and the principal data are as follows:

With reference to the steam and generator system, the flow quantity of the steam is detected by a sensor S as a steam flow signal 10, the temperature of the steam is sensed by a sensor T as a steam temperature signal 11, and the flow quantity of the feed water is detected by a detector F, the pressure signal detected thereby being converted into a signal 12 representing the flow quantity of the feed water. The temperature of the feed water is detected by a thermo-couple T as a feed water temperature signal 13 whereas the pressure of the feed water is detected by a sensor P and the pressure signal detected thereby is converted into a feed water pressure signal 14. Further, a signal 15 representing the power of the feed water pump FP, a signal 16 representing the flow quantity of the condensate, a signal 17 representing the output of the generator G, a signal 18 representing the bearing temperature of the turbine, and other signals representing the eccentricity of the turbine shaft and other conditions are also applied to the computer.

In the reactor control system, the position of the control rod CR for controlling the thermal output of the reactor is taken out as a control rod position signal 20 by the control rod position detector CRP and the neutron flux in the reactor core is detected as a neutron flux signal 21 by the neutron flux detector ND. The temperature of the reactor water circulating through the recirculation loops is detected as a reactor water temperature signal 22 by a temperature sensor T. Further, signals 23, 24, 25, 26 and 27 respectively representing the power required for driving the recirculation pump RP, the flow quantity of the recirculation water, the flow quantity of the jet pump JP, the pressure or water level in the reactor vessel RB, and the temperature thereof are also applied.

Figures 2A, 2B:
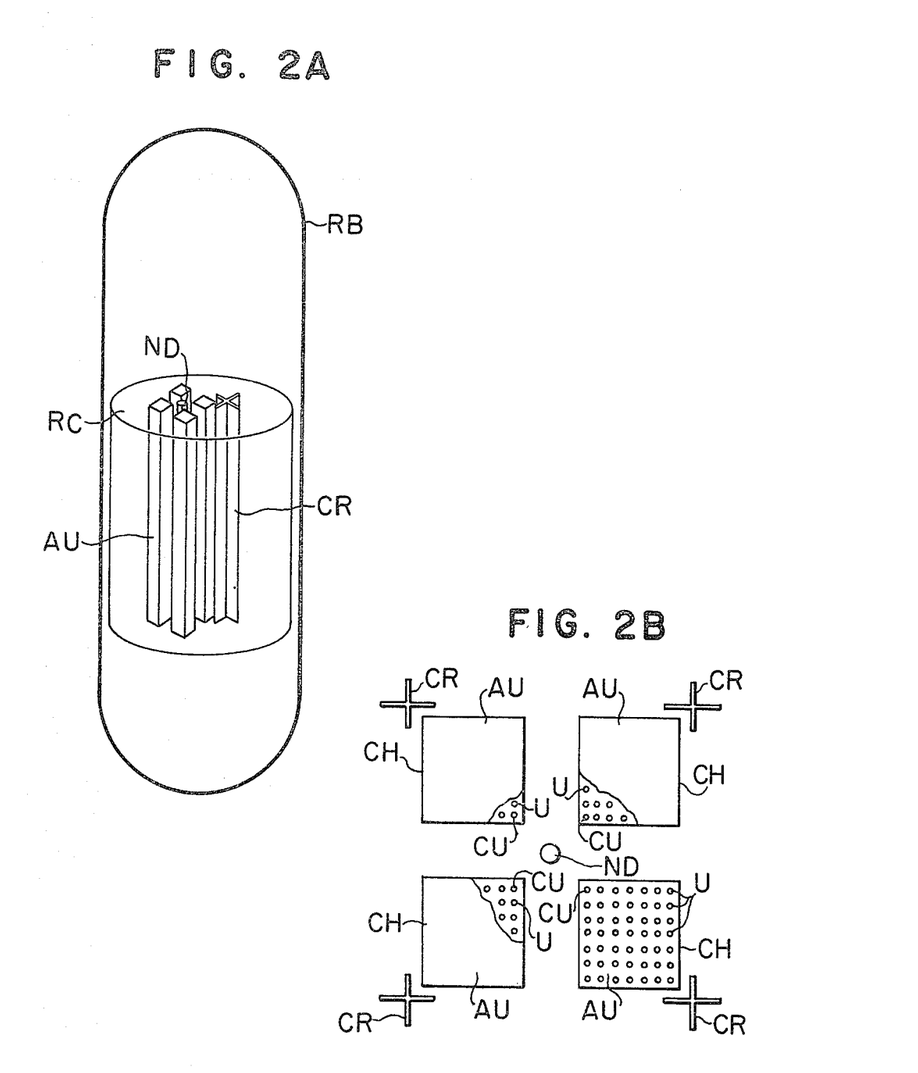
FIG. 2A is a diagrammatic perspective view showing the relationship among the reactor core, fuel rods and a control rod of a nuclear reactor.
FIG. 2B is a plan view, partly in section, of a reactor core showing the relationship among fuel rod assemblies, control rods and a neutron flux detector.

The fuel rods contained in the reactor core will now be described briefly with reference to FIGS. 2A and 2B. FIG. 2B is a plan view, partly in section, showing four fuel rod assemblies AU, four control rods CR and one neutron flux detector ND. The fuel rod assembly AU shown at the right lower position of FIG. 2B comprises uniformly spaced 49 fuel rods U contained in a channel CH. The fuel rods in respective assemblies closest to the neutron flux detector ND are termed corner fuel rods CU.

Having completed the description regarding the outline of the various machines and apparatus comprising the nuclear plant and the electronic computer for controlling them, the novel system of controlling the automatic operation of the plant will be described as follows.

The novel system of this invention has the following three features.

(1) Control within operation limits.

The machines and apparatus in the plant are operated within prescribed limits.

(2) Correction control.

When the machines and apparatus are operated beyond said limits, correction controls are performed.

(3) Anticipation control.

Controls are performed by anticipating the variations in the states of the machines and apparatus caused by the manipulation of the plant operator, such that the state variations occur in coordination with the controls of items (1) and (2).

The contents of respective controls are as follows.

(1) Controls within prescribed operation limits.

Figure 3:
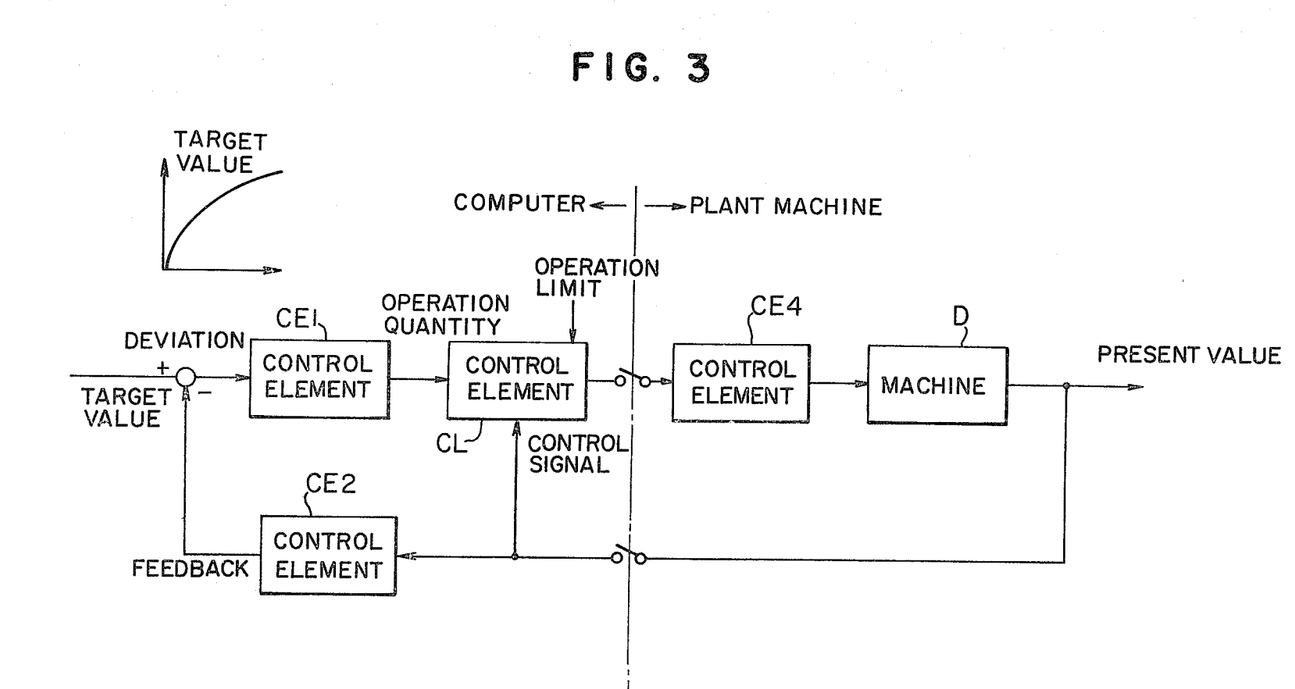
FIG. 3 is a block diagram showing a feedback control system embodying the invention.

This control utilizes a well known feedback control. The block diagram shown in FIG. 3 shows this control system. In a computer control, the target value of a machine D to be controlled is obtained from the data which has been stored in the memory device M of the computer CP (FIG. 1) or by computing various data applied to the computer from the machine D to be controlled. According to a conventional feedback control system, the difference or deviation between the target value and the present value of the controlled machine D which is fed back through a control element CE2 is processed by the computer CP to obtain the operation quantity necessary to eliminate the difference. However, according to this invention, the computer functions to make a computation for judging the operation limit in accordance with the operation quantity, the present value, the data stored or supplied from the machine, and the operation limit thus obtained is used to process the control quantity in control element or limiter CL. The output from the control element CL is supplied to the control element CE4 for the machine D through process output device PO shown in FIG. 1. Instead of using a prescribed operation limit stored in the memory device, in some cases, the operation limit is determined in accordance with the present state of operation of the machine by the operation of the computer.

Consequently, the machines and apparatus of the nuclear plant which are controlled by the computer are automatically controlled to always operate within their operation limits.

(2) Correction control.

The correction control system, one of the features of this invention, is not necessarily a feedback control system but may be an open loop control system. To perform the correction control, the computer CP processes the information stored in the memory device M or the various data from the machines and apparatus in the plant to determine whether their operation states are within their operation limits or not. If the operation states exceeds their limits, the computer produces a correction signal which is applied to the machines and apparatus through the process output device PO for restoring the operation states to normal.

(3) Anticipation control.

Further, according to the operation control system of this invention where certain machines and apparatus have operation limits, anticipation controls are performed by anticipating such operation limits.

Figure 4:
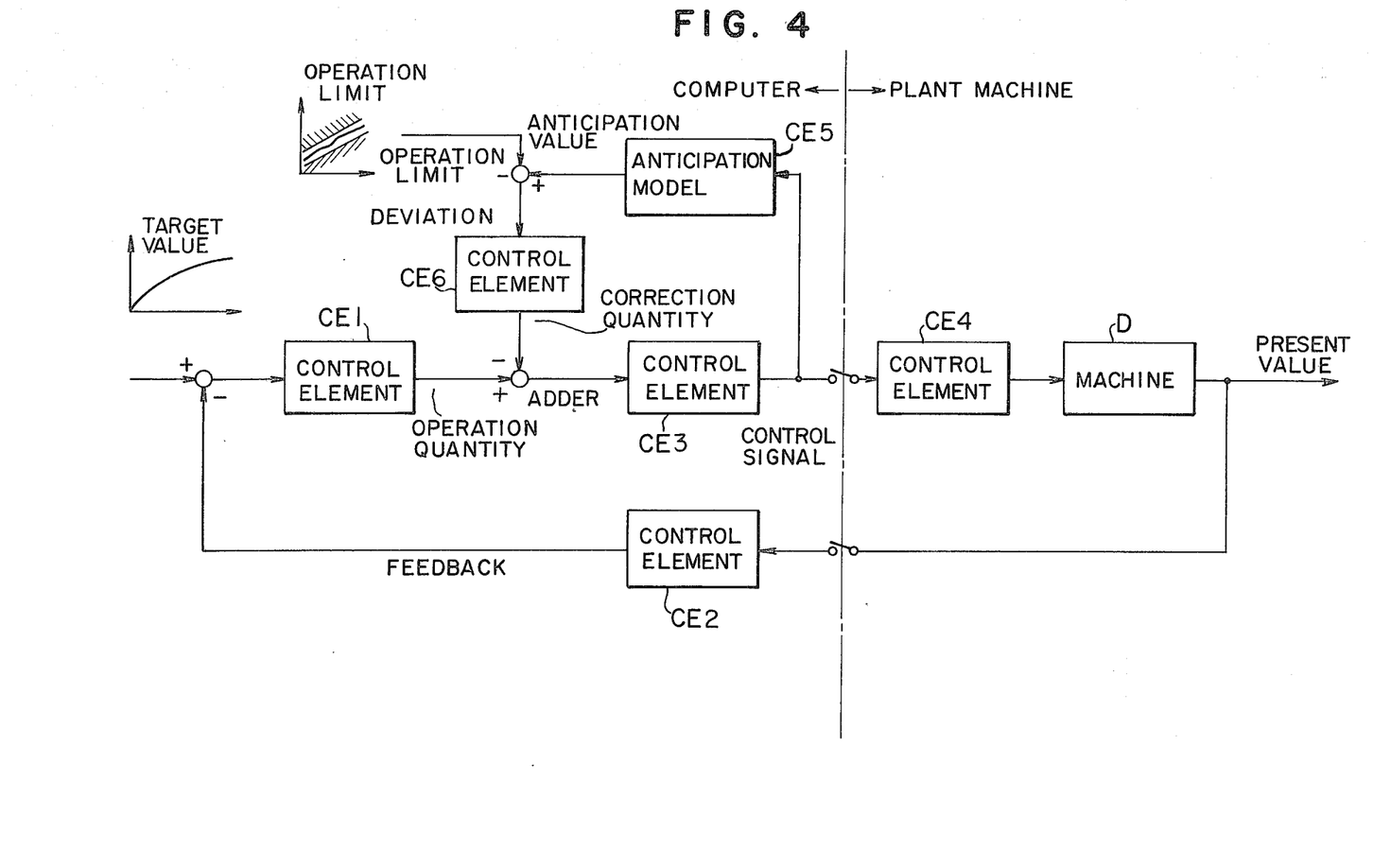
FIG. 4 is a block diagram showing an anticipation control system utilized in this invention.

FIG. 4 shows one example of such anticipation control system. The operation target value of a controlled machine D is stored in the memory device M through the process input device or computed by the computation control device CPU according to a prescribed equation and then stored in the memory device M in accordance with a command signal given by the operator. The difference or deviation between the target value and the present value of the controlled machine (which has been stored in the memory device M through the process input device (PI) and fedback through a control element CE2) is processed by a control element CE1 of the computation control device CPU to determine the operation quantity of the controlled machine D. In an ordinary control system, the control element CE3 of the computation control device processes this operation quantity for determining the output to the controlled machine D, but according to this invention instead of sending this output directly to the controlled machine, the state variation which will occur when the output is sent to the controlled machine to control the same is processed in the computation control device CPU in accordance with an equation of an anticipation model CE5 which has been stored in the memory device M for obtaining an anticipation value. This anticipation value is compared with the operation limit which has been stored in the memory device M by the computation control device CPU to obtain a deviation which is processed by a control element CE6 for producing a correction quantity. This correction quantity is added to the operation quantity produced by aforementioned control element CE1 and the sum is used as a new operation quantity for obtaining a new output through a control element CE3. The control elements CE3, CE5 (anticipation model), and CE6 constitute a convergent computation loop and the repeated computations effected by this loop are performed by the electronic computer CP and the result is applied to a control element CE4 (machine control device) from the computation control device CPU through the process output device PO thus controlling the controlled machine D. In this manner, it is possible to provide an optimum operation of the plant within prescribed operation limit by presetting a preferred operation range and by forecasting an optimum control for the target value.

As described above, in the operation control system of this invention three types of computer controls are performed. To this end the following data are written in the computer from the machines and apparatus in the plant.

(a) Data periodically applied to the computer CP through the process input device PI in terms of an actual time, processed by the computation controlled device CPU and then stored in the memory device M.

(b) Data applied to and processed by the computer and then stored in the memory device M in the same manner as the data of item (a) when the states of the machines and apparatus of the plant vary.

Principal controls among various controls of the plant effected by utilizing these data are as follows.

(1) Supervision and control of the temperatures of the reactor pressure vessel and the reactor water.

The temperature signal 27 of the reactor pressure vessel RB measured and stored in the computer (actually, temperatures in different directions and at different levels of the pressure vessel are measured) and the water temperature signal 22 at the inlet of the recirculation loop are supervised and controlled with regard to whether these temperatures are lower than an operation limit. Further, the rate of change and the temperature difference of the temperatures represented by signals 27 and 22 are computed by the computation control device CPU to determine whether they exceed operation limits or not. Having described the outline of the control, the detail thereof will now be described in the following.

Figure 5:
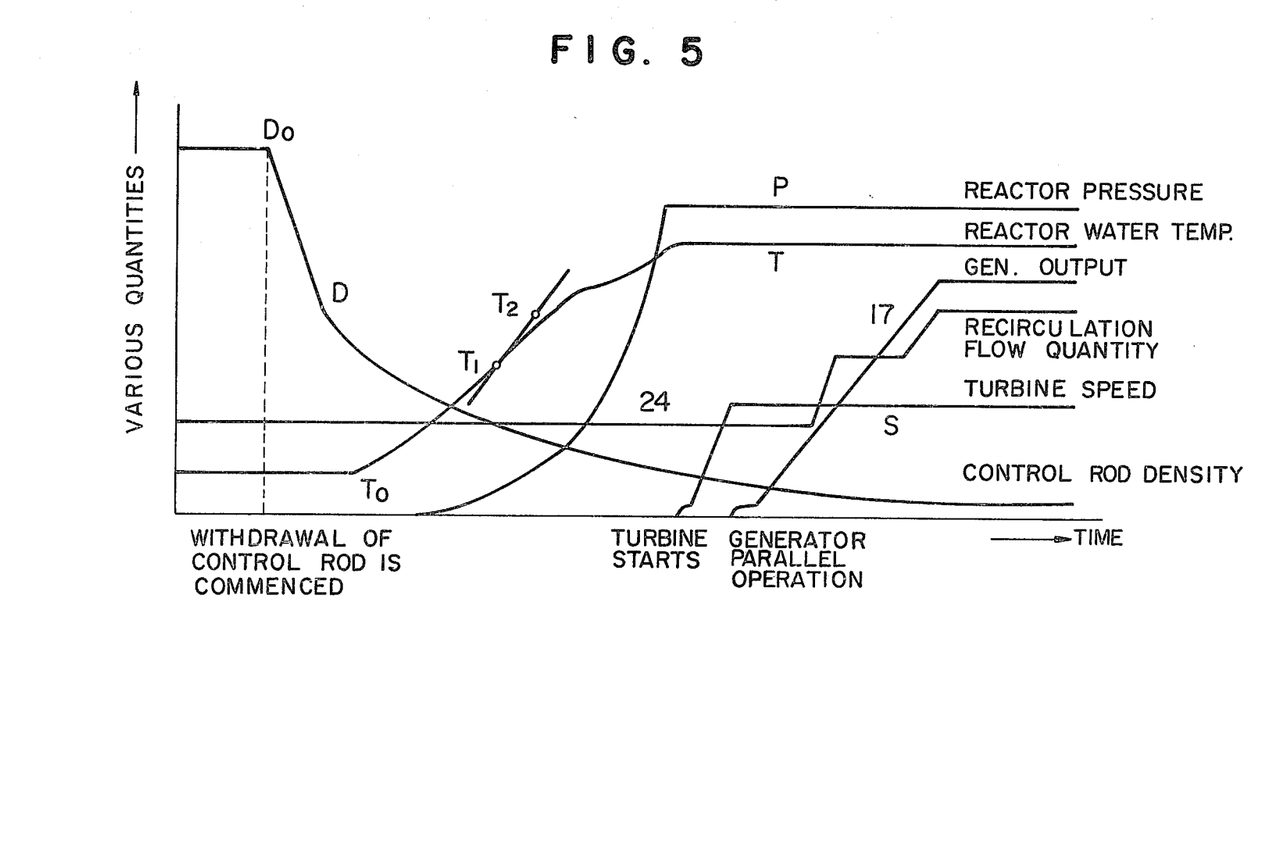
FIG. 5 is a graph showing the starting characteristics of a nuclear plant.

One example of the starting characteristics of the machines and apparatus of a nuclear plant is shown in FIG. 5, in which the abscissa represents the time and the ordinate various quantities of the machines and apparatus. The supervision and control which are performed during starting will be described with reference to FIGS. 1 and 5.

The starting of the nuclear reactor RB is commenced at a point Do at which the withdrawal of the control rod CR is commenced. Then the control rod CR is successively withdrawn and as the density D thereof decreases, the temperature T of the reactor water commences to increase gradually from To. In this manner, the reactor is started. During this procedure if the water temperature T increases rapidly as shown by T1–T2 for some reason and if the rate of change at this time exceeds a predetermined operation limit it is necessary to bring back the operation state to within prescribed limits. The reactor water temperature T periodically read into the computer through the process input device PI is processed by the computation control device CPU, the memory device M and other devices associated with the computer in accordance with equations and constants which have been stored in the memory device M to detect the fact that the rate of change of the reactor water temperature T has exceeded the operation limit after point T1. The result of this detection is applied to the control rod control device CRC through the process output device PO. This result is then applied to the control rod drive device CRD to terminate the withdrawal of the control rod. Accordingly, the thermal output of the reactor is maintained at a constant value and the reactor water temperature T is decreased to within the operation limits.

Although not shown in FIG. 5, when the rate of rise of the reactor water temperature T exceeds the operation limit, the following control is effected. More particularly, the detected result is applied to the recirculation quantity control device RVC for the recirculation loop RL from the process output device PO for applying a driving pulse to the driving motor for driving the recirculation quantity control valve RV in accordance with a prescribed control pattern which has been stored in the memory device M, whereby the degree of opening of the control valve RV is decreased to decrease the flow quantity of the recirculation water. Alternatively, the output frequency of a motor generator set (not shown) for driving the recirculation pump RP is decreased to decrease the flow quantity of the recirculation water thereby decreasing the thermal output of the reactor BWR.

When the thermal output of the reactor is decreased by stopping the withdrawal of the control rod or by decreasing the flow quantity of the recirculation water the operating state of the reactor is brought back to the normal state from an abnormal state. Although the above description relates to a control when the operating state of the reactor changes to an abnormal state, it will be clear that it is also possible to always maintain the reactor at the normal operating state by the supervisory control of the computer.

(2) Supervision and control of the output distribution of the nuclear reactor.

Although it has been the practice to calculate the output distribution in the reactor for the purpose of supervising the output distribution of the reactor, the invention is characterized in that a portion of the prior art system is used to supervise and control the output distribution.

According to the prior art system, the output distribution of the nuclear reactor is calculated by the computation control device CPU in accordance with prescribed equations and various data stored in the memory device M in a manner outlined hereinbelow. Thus, the neutron flux in the reactor is detected by the neutron flux detector ND located in the reactor. The average output of the four corner fuel rods (see FIG. 2) is calculated from the detected neutron flux by using the pattern of arrangement of control rods CR, the configuration of the fuel assemblies AU, that is the orifice configuration of the fuel channels CH, the concentration of the fuel, and the pattern of arrangement of the fuel rods as parameters. Also the output distribution coefficient among four fuel assemblies is calculated from said parameters, and this output distribution coefficient is used to calculate the output of the four fuel rod assemblies. The process of calculation described above is repeated throughout the reactor core RC to perform a convergent calculation so that the total output of the entire fuel rod assemblies will coincide with the thermal output of the core thereby determining the output distribution of the reactor.

According to this invention, the following supervision and control are performed by noting the facts that where the variation in the thermal output of the reactor is slow there is no large change in the contour of the output distribution and that in the prior art system of supervising the output distribution of the reactor no consideration has been made regarding the rate of variation (rate of rise in the thermal output of the fuel rods).

We have found that it is possible to calculate at a sufficiently high accuracy and in a short time the thermal output of the reactor by using an approximate model which is obtained by eliminating the convergent calculation from the prior art method of calculating the thermal output.

More particularly, in accordance with the method and system of this invention, the approximate model of the output distribution (or an accurate model, if sufficient time is available) is stored in the memory device of the computer, various data regarding various machines and apparatus are stored, in terms of the real time, through the process input device PI during the operation of the nuclear plant, the approximate model of the output distribution stored in the memory device is processed by the computation control device CPU in accordance with the data, the data regarding each fuel rod U of the fuel assembly AU such as the thermal output and local peaking are computed by the computer in accordance with the result of processing described above, prescribed equations and constants which have been stored in the memory device, and the result of computation is stored in the memory device. Further the computation processing described above is repeated by the computer at a predetermined frequency of computation or a suitable frequency determined by the computer based on the data regarding the operation state of the plant and the resulting data thus obtained are stored in the memory device. In this manner, the rate of rise of the thermal output of each fuel rod U is obtained by processing these data by the computer in accordance with prescribed equations stored in the memory device, and the result is also stored in the memory device.

The computer we perfer to use is the TOSBAC-7000 or TOSBAC-40 series process computer manufactured and sold by Tokyo Shibaura Denki Kabushiki Kaisha, Tokyo, Japan. This computer is provided with a process input device and a process output device to read the process data and control the process.

The method of calculating the thermal output of each fuel rod U is described in a paper by H. Hashimoto et al titled "Computer Control in VWR Plants", Toshiba Review, Vol. 24, No. 1, pages 39–43 (1969) and in a paper by M. Ito et al titled "On-Line Computer for Use in BWR Type Nuclear Electric Power Generating Plants", Vol. 22, No. 10, pages 34–40 (1971).

As described at paragraphs 3.1 and 3.1.1 of the Hashimoto et al paper, the thermal output distribution of each fuel rod assembly of the core is calculated at intervals such as once per hour. The calculation includes calculating the thermal output of respective portions of the assembly to a first approximation which can be expressed mathematically by the equation $$R_{th} = \frac{\theta_{t_n} - \theta_{t_{n-1}}}{DT}$$

Where
$\theta_{t_n}$ is the thermal output at time $t_n$,
$\theta_{t_{n-1}}$ is the thermal output at time $t_{n-1}$,
DT is the interval between $t_n$ and $t_{n=1}$; that is, the predetermined frequency of computation; and
$R_{t_n}$ is the rate of rise of the thermal output between times $t_n$ and $t_{n-1}$.

Figure 6:
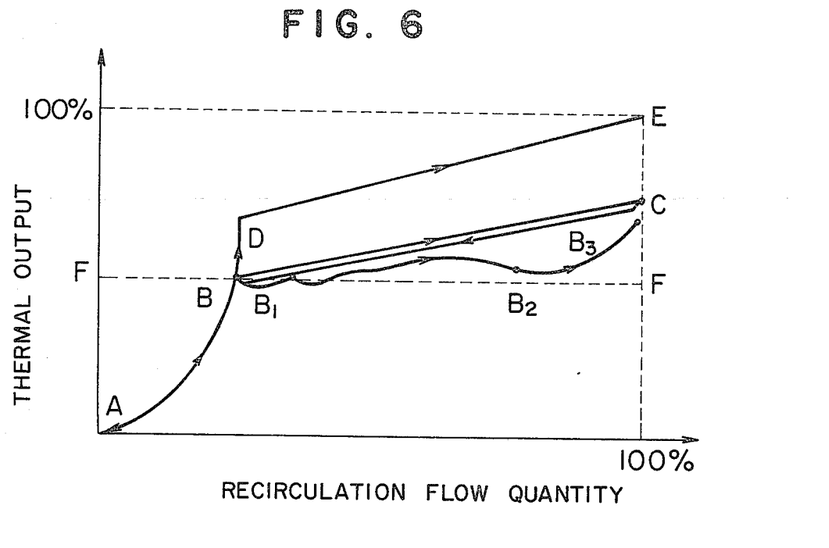
FIG. 6 is a graph showing the thermal output characteristic of the nuclear plant.
Figure 7:
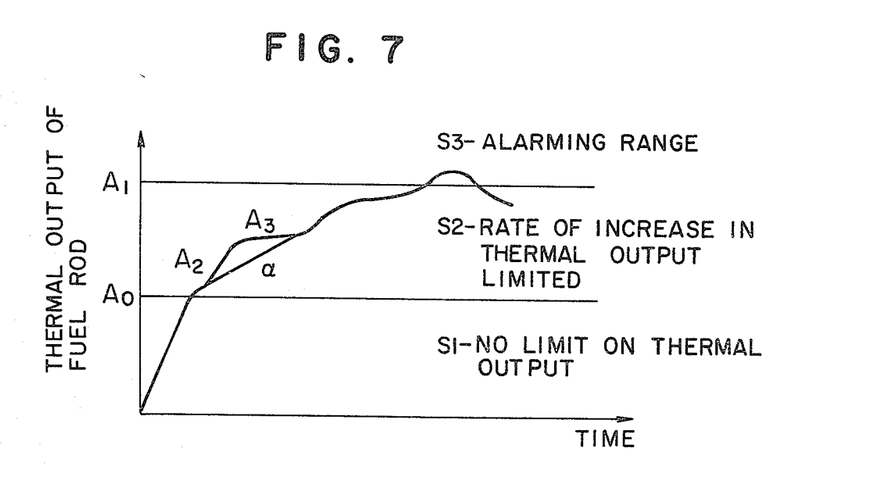
FIG. 7 is a graph showing the operation limits of the thermal output of a fuel rod.

FIG. 6 shows one example of the thermal output characteristic of one fuel rod of a fuel rod assembly mounted in the reactor during the starting period thereof, and FIG. 7 is a graph showing the operating range within operating limits of the fuel rod. The starting operation of the reactor will be described hereunder in more detail with reference to FIGS. 6 and 7.

As the reactor is started, its output increases gradually as well as the thermal outputs of respective fuel rod assemblies and respective fuel rods thereof. As shown in FIG. 6, the thermal output increases along a curve A–B due to the withdrawal of the control rod and the increase in the quantity of the recirculating water. During this interval, various data of the reactor are written into the memory device M through the process input device. The data thus stored are used to calculate the thermal output of the fuel rod and its rate of increase. With reference to the result of calculation, the computer judges whether the thermal output or rate of increase thereof exceeds or not the operation limit of the linear output (thermal output per unit length of one fuel rod) or the rate of rise of the linear output which have been stored in the memory device.

As the starting operation proceeds, the thermal output increases to a point E of 100% output through points B, C and D. When the thermal output is controlled by the control rod the thermal output increases along a path B–D, whereas when the thermal output is controlled by controlling the flow quantity of the recirculation water the thermal output increases along paths B–C and D–E. The region above point B or line F—F in FIG. 6 corresponds to the region shown in FIG. 7 in which the thermal output of the fuel rod exceeds a point Ao. In FIG. 7, a region S1 below the thermal output Ao represents a range in which there is no limit for the thermal output and in a range S2 between Ao and A1 there is a limit for the rate of increase in the thermal output. In this range, the operation limit for the rate of rise in the thermal output of the fuel rod is $\alpha$, for example.

A range S3 above point A1 represents a range in which an alarm is to be made. Thus, when the thermal output of a fuel rod exceeds point A1, an alarming device is operated indicating that continued operation is not permissible. In this manner, as it is necessary to limit the operation of the reactor in accordance with the thermal output of the fuel rod, the control pattern B→C→B→D→E of the output is determined by the operation of the computer in accordance with various data, constants and equations stored in the memory device. Alternatively, the control pattern is determined by writing the output control command given by the operator into the computer through the process input device.

Once the control pattern is determined in this manner, the result is sent to the machines and apparatus in the plant through the process output device for controlling them. More particularly, in FIG. 1, the output from the computer CP is applied to the recirculation flow quantity control device RVC through the process output device PO to vary the opening of the flow control valve RV. The flow quantity of the recirculation water can also be varied by varying the speed of the recirculation pump by varying the degree of coupling of a fluid coupling of a motor generator (not shown) provided for operating the recirculation pump RP. Further, a signal is applied to the control rod control device CRC for operating or stopping the operation of the control rod through the process output device PO. In this manner, the computer CP operates to vary the reactor output according to the control pattern B→C→B→D→E.

However, when the thermal output exceeds line F—F, FIG. 6, (or the region above point Ao in FIG. 7), as there is the operation limit $\alpha$ for the rate of rise in the thermal output of the fuel rod, it is necessary to constantly supervise $\alpha$ during the process of output control according to the control pattern B→C→B→D→E. The computer computes the thermal output of the fuel rod and the rate of rise thereof based upon the data read out through the process input device PI or various data of the machines and apparatus which have been stored in the memory device. The computation control device CPU, memory device M and other devices associated with the computer processes the result of computation according to prescribed equations stored in the memory device to determine whether the result of computation is larger than the operation limit or not, and whether the control follows the prescribed control pattern or not. When the control does not follow the prescribed control pattern, a control signal is sent to the recirculation flow quantity control device RVC or the control rod control device CRC through the process output device for restoring the normal control pattern or for supervising or controlling the nuclear plant such that it operates in the range within normal operation limits.

Where the control is to be carried out according to the control pattern B→C→B→D→E, the control from B to C is effected by increasing the recirculation flow quantity. In this case, when the anticipation control is effected by the computation of the computer so as to follow straight line B-C, the anticipation control is effected carefully by considering the operation limit so that the actual control will not depart greatly from the straight line B-C as shown by the curve B→B1→B2→B3, FIG. 6 or depart from the operation limit as shown by A2-A3 in FIG. 7.

Figure 8:
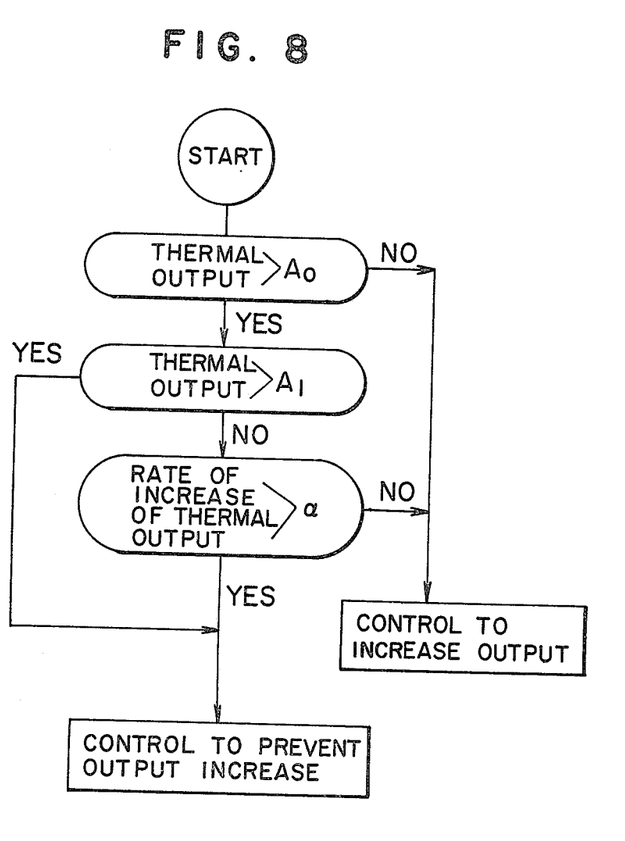
FIG. 8 is a flow chart of a supervisory control system for the thermal output of a fuel rod.

FIG. 8 is a flow chart showing the supervising and controlling system for the thermal output of the fuel rod described above.

More particularly, during the operation of the nuclear plant, the computer CP operates to read various data regarding various machines and apparatus of the plant through the process input device PI or to compute the thermal output of the fuel rod or the rate of increase of the thermal output based on such data or previously stored data by the computation control device CPU and then compare the thermal output and the rate of increase thereof thus determined with predetermined limits Ao, A, of the thermal output and with the limit $\alpha$ of the rate of increase of the thermal output. When the present thermal output is smaller than the limit Ao, a control to increase the output is performed. On the other hand, when the thermal output is larger than the limits Ao and A, the control for increasing the output is prevented. When the thermal output is larger than the limit Ao but smaller than the limit A1, and when the rate of increase of the thermal output is smaller than the limit $\alpha$, the control to increase the output is performed, whereas when the rate of increase of the thermal output is larger than the limit $\alpha$, increase in the thermal output is prevented.

In response to respective control conditions judged as above described, the computer provides a control signal to either the recirculation flow quantity control device RVC or the control rod control device CRC through the process output device PO.

In the foregoing description while the automatic operation control system of this invention has been described in terms of the supervision and control of the temperature of the pressure vessel of a nuclear reactor, the temperature of the reactor water, and the output distribution of the reactor, the control system of this invention involving the anticipation control as well as the correction operation described above is also applicable to a programmed control of various machines and apparatus of the nuclear plant which should be operated within prescribed limits such as the temperature of the bearing metal of the steam turbine, water purifying apparatus, etc.

As has been described above, the invention provides an improved operation control system for a nuclear electric power generating plant which requires an extremely complicated control, said control system utilizing an electronic computer and capable of accurately, safely and economically controlling the nuclear plant.

Since a nuclear plant comprises a number of machines, apparatus, devices and component elements thereof as above described, in the following claims the term machine or apparatus is used to mean any one them.

We claim:

1. A method of controlling the operation of a nuclear power electric generating plant by means of an electronic computer, said electronic computer including a computation control device, a memory device, a process input device and a process output device, said generating plant having a machine including a turbine-generator, comprising the steps of presetting a predetermined operation target value and an operation limit of said machine into the memory device of said computer, determining the present operation value of said machine, obtaining the difference between said operation target value and the present operation value of said machine to produce an operation quantity at the output of a first control element, storing an anticipation model in the memory device of said computer, said anticipation model anticipating the change in the operation state of said machine which would occur when the machine is controlled by said difference, comparing said operation limit with a value determined by said operation model to produce a correction quantity at the output of a second control element, adding said operation quantity at the output of said first control element to the correction quantity at the output of said second control element to produce a control signal, coupling said control signal to the memory device of said computer to modify said anticipation model, and coupling said control signal to said machine through a third control element thereby controlling the output of said machine.

2. A method of controlling the thermal output of a nuclear reactor plant by means of an electronic computer having a computation control device, a memory device, a process input device and a process output device, said nuclear reactor including a reactor core provided with a plurality of nuclear fuel rods, means for controlling said fuel rods and means for controlling the recirculation flow through said nuclear reactor, comprising the steps of storing a predetermined approximate model of the thermal output distribution of said nuclear reactor in said memory device, storing in said memory device various data regarding the operation state of said nuclear reactor plant in terms of real time, computing the operation state of each fuel rod of said reactor core, said operation state being computed in accordance with said stored approximate model of the thermal output distribution of said nuclear reactor and said stored real time data, repeating said computation at a predetermined frequency thereby determining the rate of rise of the thermal output generated by said each fuel rod, forming a control signal which varies in accordance with the computed operative state of each fuel rod and the rate of rise of thermal output generated by each fuel rod, applying the control signal by means of said process output device of said computer to means for controlling the recirculation flow through said reactor and to said means for controlling said fuel rods to vary the output of said reactor according to a predetermined control pattern.

* * * * *